No. 868,311. PATENTED OCT. 15, 1907.
C. T. WHITE.
HOSE COUPLING.
APPLICATION FILED NOV. 1, 1905.
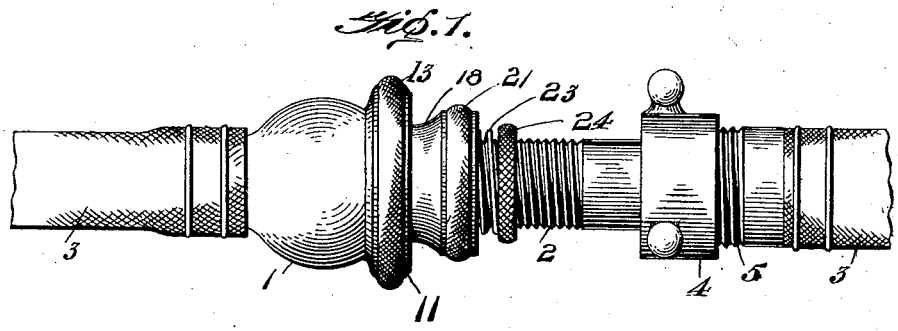
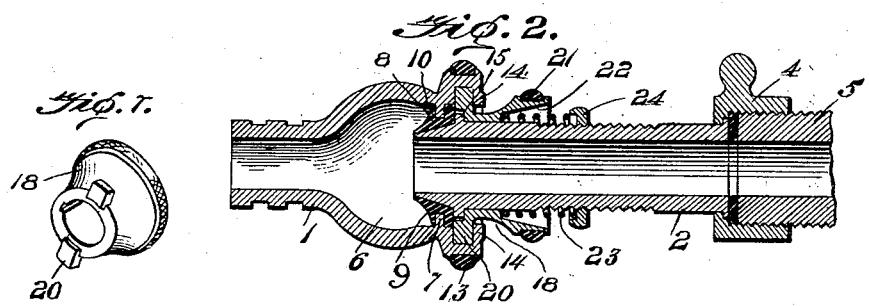
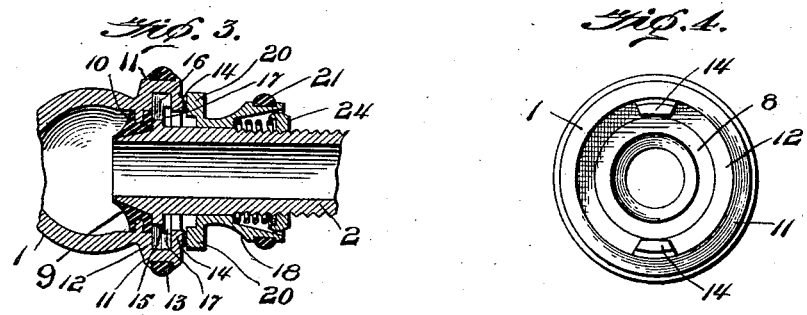
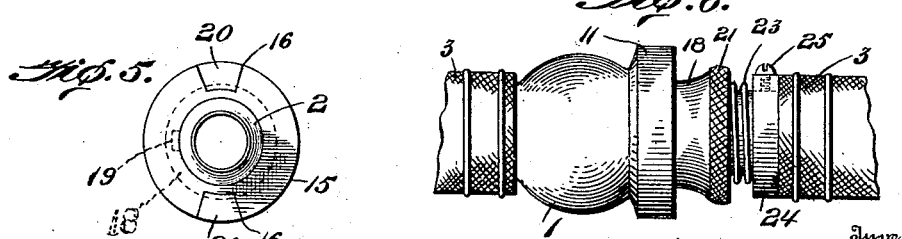
Witnesses
B. M. Offutt
W. L. Edmonston
Inventor
Charles T. White
By Theodore Dalton
Attorney

UNITED STATES PATENT OFFICE.

CHARLES T. WHITE, OF NILES, MICHIGAN.

HOSE-COUPLING.

No. 868,311.  Specification of Letters Patent.  Patented Oct. 15, 1907.

Application filed November 1, 1905. Serial No. 285,444.

*To all whom it may concern:*

Be it known that I, CHARLES T. WHITE, a citizen of the United States, residing at Niles, in the county of Berrien and State of Michigan, have invented new and useful Improvements in Hose-Coupling, of which the following is a specification.

This invention has reference to improvements in hose coupling and its object generally is to provide one in which the parts or members may be quickly and conveniently connected and automatically locked against disengagement.

A further object is to construct the parts so as to insure against leakage at the joints of the coupling, there being an elastic casing arranged to expand against the action of the inserted member and automatically seal the joint against leakage when back pressure is brought to bear.

A still further object is to provide the outer surfaces of the parts with an elastic buffer which serves the dual purpose of preventing the parts breaking when coming in contact with a hard surface and providing a convenient hand grip for manipulating the parts of the coupling.

A still further object is to provide a hose coupling, the parts of which, although intended to be readily coupled and uncoupled, may be permanently connected.

These and other objects will appear as the nature of the invention is better understood, reference being had to the following description and to the accompanying drawings in which:—

Figure 1 is a side elevation of the coupling complete. Fig. 2 is a longitudinal section of the members coupled, with the lugs of both members in alinement. Fig. 3 is a longitudinal section showing the male member inserted in the female member in the act of coupling, but with the locking lugs of the male member retracted and engaged with the front face of the lugs of the female member. Fig. 4 is an end view of the female member. Fig. 5 is an end view of the male member. Fig. 6 is a side elevation of a modification, and Fig. 7 is a perspective view of the locking ring of the male member.

Making renewed reference to the drawings wherein similar reference characters indicate corresponding parts throughout the different views, 1 designates the female member and 2 the male member, to the outer ends of each of which sections of hose 3—3 may be connected, as shown in Figs. 1 and 6, and in Fig. 1 the male member may be permanently secured to the ends of the hose by means of the thimble 4, swiveled upon the end of member 2 and having internal screw threads to engage with the threads of a cap 5.

The female member 1 which is preferably formed with a spherical chamber 6 is provided with an internal annular rib 7 on which is supported an elastic packing 8. The packing is grooved circumferentially so as to fit upon the rib 7 and its outer face is preferably concave as at 9, so as to provide a recess or somewhat hollow surface for the impact of a fluid upon back pressure, which back pressure will tend to automatically seal the lip 10 against the face of the rib 7 and also against the end of the male member 2 so as to prevent leakage around the joint of the coupling. The bore of this packing is preferably inclined and when not expanded by the end of the male member, which has a corresponding incline or bevel, the inner end thereof is contracted but may be readily expanded to accentuate the curvature of the face 9 and to seal the joint of the members against leakage. The inner end of the female member is enlarged as at 11 and provided with an internal annular shoulder 12, which is flush with the outer face of the packing 8. It is also provided with an exterior annular groove in which an elastic band 13 is fitted, said band serving as a buffer when the coupling contacts with a hard surface and as a hand grasp when the parts are to be coupled or uncoupled. The rim, on which the buffer 13 is mounted, projects beyond the shoulder 12 so as to form a socket in which the male member 2 fits. The outer edge of the rim is provided with a pair of inwardly projecting lugs 14 arranged opposite to each other, as shown in Fig. 4.

The male member 2 is provided with a flange 15 which fits into the socket formed by the rim of the female member, as shown in Figs. 2 and 3. This flange is provided with oppositely arranged notches 16 Figs. 3 or 5 which permit it to pass the lugs 14 on the rim of the female member. This flange 15 is further provided with an annular groove 17.

From the description thus far given it will be seen that when the members are brought together the beveled end of the male member will engage the inclined bore of the packing 8 and seal the joint against leakage, while the flange 15 of the male member enters the socket in the rim 11 and by giving one of the members an axial movement the notches 16 in the flange 15 will be brought out of alinement with the lugs 15 of the rim 11 and thus the members will be held interlocked. It is apparent, however, that should the male member be rotated to a position where the notches and lugs are in alinement, the parts will become disengaged. Now to prevent this accidental disengagement of the members I have provided means for locking the flange of the male member in the socket of the female member. This means consists of a locking ring or thimble 18 shown best in Fig. 7. This ring is movable longitudinally on the male member 2 and held against rotation by a feather 19 shown in dotted lines in Fig. 5. This locking ring has a tapering outer face, the smaller end of which fits into the groove 17 of the flange 15; and at diametrically opposite points project locking lugs 20, which are arranged in alinement with the notches 16 of the flange 15 and which project beyond the edge of the ring so as to entirely fill the notches of the flange and snugly fit the socket of the female member, as shown in Fig. 2. The inner end of the ring is flared and provided with an exterior groove in which a rubber buffer 21 is mounted. The flaring inner end provides a socket 22 in which is mounted a helical spring 23 which surrounds the male member and which bears at its other end against a ring 24. This ring may be either stationary or adjustable and it is shown in Figs. 1, 2 and 3 as being threaded upon the male member so as to be adjusted longitudinally to regulate the tension of the spring 23. It may also be adjusted to engage the locking ring 18, so that the latter cannot be withdrawn from the socket of the female member and thus the coupling will be made permanent. In Fig. 6 this locking ring is shown as fixed upon the male member by a set screw 25 and, although not as readily adjusted in this form, it may be moved by releasing the said set screw.

When the members are apart the locking ring 18 of the male member is normally forced outwardly by the spring 23 so as to bring its locking lugs 20 into the notches 16 of the flange 15, but when the parts are brought together to be coupled the flange 15 of the male member enters the socket of the female member, provided the notches in the flange are opposite the lugs 14 of the female member, but as the locking lugs 20 are in the path of the lugs 14 the former will be engaged by the latter and the locking ring will be forced rearwardly against the action of the spring 23. These positions of the parts are shown in Fig. 3. Now, by giving one of the members a partial turn, the locking lugs 20 will clear the lugs 14 and the spring 23 will immediately force the lugs into the recess of the female member and into the notches of the flange of the male member, and now if the parts be turned so as to bring the lugs of the female member and the notches of the flange of the male member into alinement, the members cannot be uncoupled for the reason that the locking lugs 20 will be in the path of the lugs 14, as shown in Fig. 2. It will be seen that both faces of the locking lugs 20 are permitted to lie flush with both faces of the flange 15 by virtue of the end of the locking ring entering the groove 17 in the flange. To uncouple the members it is necessary to retract the ring 19, as by catching hold of the rubber hand grip 21, so as to withdraw the locking lugs 20 from the notches 16 of the flange and then by turning the parts so as to bring the lugs 14 into alinement with the notches 16, which is the position shown in Fig. 3, the members may be separated.

Having thus described my invention, what I claim and desire to secure by Letters Patent is:—

1. In a hose coupling, a male member having a flange provided with notches, a female member having a socket to receive the flange and inwardly projecting lugs to pass through the notches and traverse the flange, a retaining member on the male member and slidable thereon, lugs on the retaining member adapted to enter the notches in the flange, a spring engaging the retaining member, and a ring adjustable on the male member and engaging the spring, said ring also adapted to engage the retaining member and lock the same with the lugs thereon within the notches of the flange.

2. In a hose coupling, a male member having an outwardly projecting flange, provided with peripheral notches, and also having a conical end projecting beyond the flange, a packing having a conical opening to receive said end and a circumferential groove, a female member having an enlarged chamber opposite said packing and an inwardly projecting flange within said groove, and also having a socket to receive the flange of the male member and inwardly projecting lugs to pass through the notches and traverse the flange, and a retaining member having lugs adapted to enter and fill the said notches and together with the flange present a continuous retaining surface traversed by the lugs.

In testimony whereof I affix my signature, in presence of two subscribing witnesses.

CHARLES T. WHITE.

Witnesses:
   J. J. VAN RIPER,
   T. J. TORMEY.